United States Patent [19]
Frederick

[11] 3,931,729
[45] Jan. 13, 1976

[54] DYNAMIC FORCE MEASURING INSTRUMENT FOR FOUNDATION PILE AND CASING

[76] Inventor: Leonard L. Frederick, 15 Crestview Terrace, Whippany, N.J. 07981

[22] Filed: Dec. 27, 1973

[21] Appl. No.: 428,675

Related U.S. Application Data

[63] Continuation of Ser. No. 233,651, March 10, 1972, abandoned.

[52] U.S. Cl. .................. 73/11; 73/84; 73/DIG. 2
[51] Int. Cl. ............................................. G01L 1/12
[58] Field of Search ..... 73/11, 12, 84, 88.5, DIG. 2; 336/20; 310/26; 324/34 MA, 34 ST

[56] References Cited
UNITED STATES PATENTS

| | | | |
|---|---|---|---|
| 2,269,760 | 1/1942 | Eldredge | 73/DIG. 2 |
| 3,115,774 | 12/1963 | Kolb | 73/DIG. 2 |
| 3,535,919 | 10/1970 | Budlong et al. | 73/84 |

FOREIGN PATENTS OR APPLICATIONS

| | | | |
|---|---|---|---|
| 1,315,183 | 12/1962 | France | 73/DIG. 2 |

*Primary Examiner*—Charles A. Ruehl
*Attorney, Agent, or Firm*—Edwin E. Greigg

[57] ABSTRACT

This invention relates to the measurement of the driving force used for pile driving and, more specifically, to the use of coils for sensing magnetostrictive effects within the pile which develop when the pile is struck or driven into the ground.

6 Claims, 4 Drawing Figures

DYNAMIC FORCE MEASURING INSTRUMENT FOR FOUNDATION PILE AND CASING

This is a Continuation, of application Ser. No. 233,651, filed March 10, 1972, now abandoned.

BACKGROUND OF THE INVENTION

As a pile is driven, the operator of the pile driver must be careful to control the force of the blows applied to the pile so as not to exceed the elastic limit of the pile material in order to minimize costly tip damage. Those who are familiar with pile driving are well acquainted with the condition known in the art as "overdriving" and the ultimate damage that results therefrom. To minimize such damage, drive caps are fitted over the head of the pile to evenly transmit the hammer blows to the pile, while at the same time maintaining the head of the pile in alignment with the hammer by guiding the head parallel to the leads frame and retaining the pile in a straight predetermined path.

Though this helps to mitigate some of the damage, the burden in most cases falls largely upon the experience of the operator to determine the driving force required. For a given set of conditions, tests may be made to help the judgment of the operator and further, strain gauges may be used to determine the force of the blow and the dynamic forces within the pile. Strain gauges, however, must be cemented or otherwise attached to the beam, and it is a relatively time consuming and costly process to mount them properly. The strain gauge is also a very fragile device and its reliability under the repetitive dynamic shock loading to which the pile is subjected is, to say the least, questionable.

After a pile is driven to the proper depth, there remains a need for measurement of the static bearing load which the pile will support, which is usually done by loading a test pile with weight until it moves. This is called a dead load bearing test and is also a time consuming and expensive process. By accurate measurement of the dynamic forces below which the pile will not move, the bearing capacity may be reasonably estimated thus saving considerable time and expenses.

The invention disclosed herein, as well as the method by which it is achieved, provides a novel means for utilizing magnetostrictive principles for accurately and quickly determining the driving force applied to the end of the pile, the visual indication of which can be displayed directly to the operator of the pile driver for proper adjustment and accurate control of the driving force. The principles of this invention can be further used to provide a means for determining the equivalent static bearing capacity of the pile after it is driven to a position where it should have attained its bearing capacity. Magnetostriction can be described as the deformation of a material causing the generation of an electric current which influences a magnetic field, or vice versa, i.e., deforming a ferrous material under the influence of the magnetic field and inducing a current which accordingly changes the magnetic field. Further, the change in the magnetic field is proportional to the deformation within the elastic limit, thus such deformation may be determined by the magnitude of the change. Normally, this effect is small and noticeable under most conditions, however, the tremendous driving force used in driving a pile gives rise to usable signals which can be sensed with instruments of normal sensitivity and be used to determine the force with which the pile was struck.

OBJECTS OF THE INVENTION

Accordingly, it is the principal object of the invention to provide a transducer that is not directly connected to the pile or drive cap that will measure the force from the hammer that is applied to the pile with extreme accuracy to thereby prevent damage to the tip of the pile.

It is also an object of this invention to provide a transducer that will accurately measure the maximum threshold force from the pile driving hammer that can be applied to the pile without causing permanent penetration of the pile into the ground. Thus, the maximum bearing capacity of the pile can be determined immediately and thus eliminates the need for a costly dead load bearing test.

A still further object of this invention is to provide a transducer which can be quickly made available for operation to measure the force from the pile driving hammer as it is applied to the pile, such an arrangement thus facilitating the driving of piles more economically.

Still another object of this invention is to provide a transducer that will measure the force from the pile driving hammer and display the magnitude of the force thereof by means of a simple portable visual indicator that is positioned in such a manner that the operator of the pile driver can adjust the hammer he is controlling during the pile driving operation.

Yet a further object of this invention is to provide a transducer that can be positioned adjacent to ground level to measure the force from the pile driving hammer thereby eliminating the requirement of long cables which would extend to the top of the pile.

An additional object of the present invention is to provide a method of determining the static load bearing capacity of a pile which avoids the need of statically loading the pile.

The foregoing method object is accomplished in accordance with the present invention by driving the pile into the ground by a series of blows, adjusting the force of the blows to the maximum threshold impact that can be applied to the pile without causing permanent penetration or set of the pile, sensing the force of the threshold impact, indicating the sensed force to an attendant and determining the static load bearing capacity from the indication.

In a preferred aspect, the method according to the present invention includes indicating the force in terms of the static load bearing capacity of the pile.

In a further preferred development of the method the sensing step is effected by means associated with the pile, this means preferably being a transducer.

Further objects and advantages will become more apparent from a reading of the following specification taken in conjunction with the drawings.

DESCRIPTION OF THE EMBODIMENTS

Figure 1:
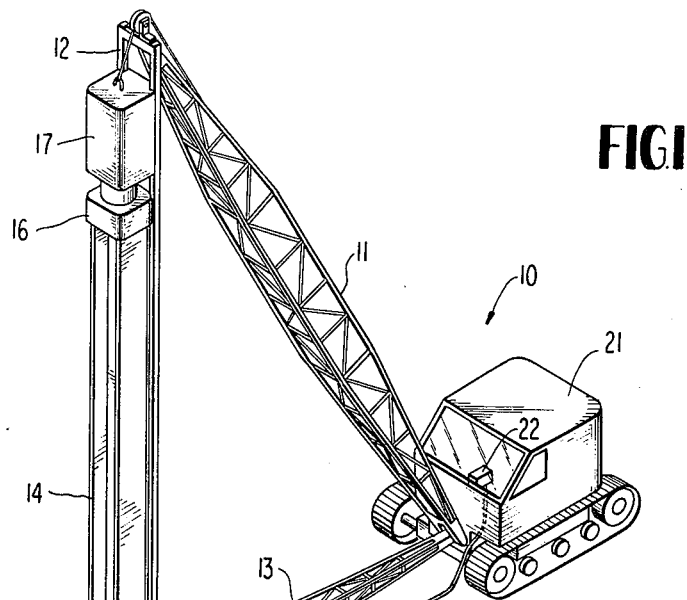
FIG. 1 shows a perspective view of a mobile pile driver mounted on a crane with the relative positions of the transducer and readout units.

Turning now to FIG. 1, there is shown a view of the customary mobile pile driving crane 10 on which is mounted a boom 11, which is swivelly mounted at its upper end by hammer leads 12, and at its lower end by a bottom brace 13. For a better understanding of the function of the bottom brace, reference is made at this time to my earlier filed patent application Ser. No. 142,182, filed on May 11, 1971 now U.S. Pat. No. 3,817,091 granted June 18, 1974. The pile 14 which is shown in position preparatory to be driven into the earth is supported at its lower end by the ground at the point generally denoted as 15, and at its upper end by the drive cap 16 which is slidably associated with the leads 12 so that the cap maintains the pile 14 in alignment with the leads at all times, the drive cap arranged to slide down as the pile is driven into the ground. Supported adjacent to the top of the leads and above the drive cap is a pile driving hammer 17, which is slidably associated with the leads and thereby arranged to follow the drive cap 16 and pile 14 as it is driven into the ground as indicated. Loosely fitted adjacent to the bottom of pile 14 without any physical or direct contact there is the transducer 18. Electrically connected to the transducer 18, as generally shown at 19, is a cable 20 which may lie on the ground or be arranged to be carried along the longitudinal extent of the bottom brace 13 and into the cab 21 where it is attached to the visual readout unit 22 positioned in front of the operator so that he can maintain a constant surveillance of the progress of the pile while he controls the operation of the pile driver hammer 17.

It is believed to be apparent that since the transducer is positioned substantially at ground level, it is easily situated prior to erecting the pile into place, but must be lifted up over the top of the pile after the driving operation is completed and therefore the cable 20 should be sufficiently long enough to accomplish this purpose or the cable must be provided with some type of disconnect means, not shown.

Figure 2:
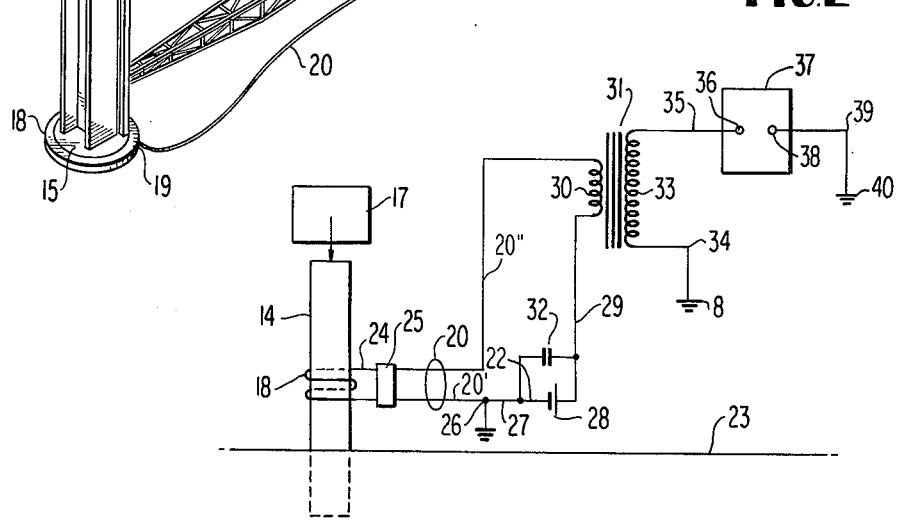
FIG. 2 shows a schematic view of the transducer and readout system using an impedance matching transformer.

Referring now to FIG. 2, there is shown a pile 14 which has been partially driven into the earth 23 by means of the pile driving hammer 17 shown supported above it. Loosely wound around pile 14 is the transducer 18 which comprises a single conductor 24, both ends of which terminate in a connector means 25. Extending from the connector means 25 and electrically connected to the transducer 18 is a pair of conductor cables 20 with one wire 20' being connected to ground at point 26. Also connected to ground at point 26 by a wire 22 is the negative terminal of battery 28 with the positive terminal connected by wire 29 to one end of the primary winding 30 of impedance matching transformer 31. Connected in parallel with battery 28 is capacitor 32, one end being connected to the negative terminal and the other end connected to the positive terminal, so that AC signals bypass the battery. The second wire 20'' of cable 20 is connected from the connector means 25 to the other end of primary winding 30 of impedance matching transformer 31.

One end of the secondary winding 33 of impedance matching transformer 30 is connected to ground as at 34, the other end connected by wire 35 to the input terminal 36 of oscilloscope 37. The second terminal 38 of oscilloscope 37 is connected by wire 39 to ground as at 40.

It will be clear to those skilled in the art that a signal is induced into the transducer 18 by the magnetic field produced in the steel pile when it is struck and that this signal bypasses the battery through the capacitor 32 and is then amplified by the transformer action in the impedance matching transformer 31 to a usable voltage level to drive the oscilloscope 37. The signal level is proportional to the force with which the pile is struck and therefore the amplitude of the signal displayed on the oscilloscope is also proportional to the force. The battery 28 is used to establish a magnetic field level in the pile which changes when the pile is struck, but does not affect the actual signal that is induced into the transducer 18.

It is also believed to be apparent to those skilled in the art that the signal level induced into the transducer 18 is also governed by the number of turns and the gauge of the wire, and the same principles apply as when designing transformers, i.e. for high frequencies, a generally low impedance winding is required, whereas the input to the oscilloscope requires a high impedance to prevent loading.

Other methods of isolating the energizing voltage of the transducer 18 from the oscilloscope can be used.

Figure 3:
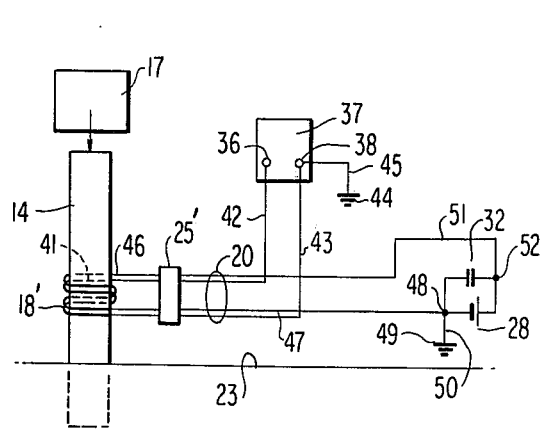
FIG. 3 shows a schematic view of the transducer utilizing bifilar windings and a transformerless readout system.

Referring now to FIG. 3, there is also shown a transducer 18' as a bifilar winding and in which a pair of insulated conductors 41–46 are wound into a coil and the four ends terminate in a connector 25'. Electrically connected to conductor 41 of transducer 18' at connector 25' is wire 42, which in turn is connected at its opposite end to the input terminal 36 of the oscilloscope 37. Electrically connected to the other end of winding 41 of transducer 18' at connector 25' is a wire 43 which is connected at its opposite end to the grounding terminal 38 of oscilloscope 37 with this terminal also being grounded as at 44 by wire 45. The second conductor 46 is electrically connected at one end at connector 25' then to wire 47 which is in turn connected at its opposite end to the negative terminal 48 of the energizing battery 28. This negative terminal is also grounded as at 49 by a wire 50. Electrically connected to the other end of the conductor 46 at connector 25' is the wire 51 which is connected at its opposite end to the positive terminal 52 of the battery 28. Connected in parallel with battery 28 and extending across its terminals 48 and 52 is a bypass capacitor 32 which serves as previously stated to bypass the induced high frequency signal past the battery in a manner well known to the art.

It will be apparent to those skilled in the art that this construction isolates the oscilloscope circuit from the battery circuit, while the intimacy of the two conductors of the bifilar-wound transducer 18 closely couples the sensing winding 41 into the magnetic field produced by the energizing winding 46. Other components of the system which are shown but not presently described function in the manner previously described.

Figure 4:
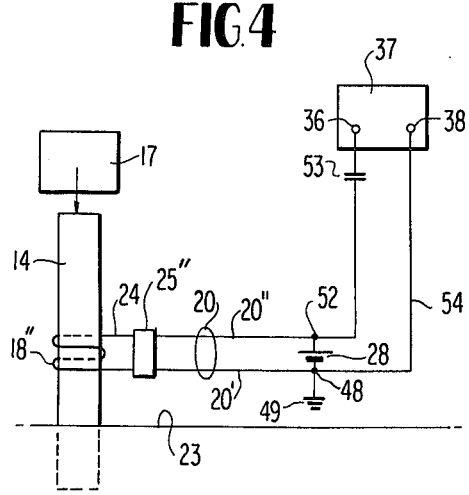
FIG. 4 shows a schematic view of the transducer utilizing a single winding and a capacitive coupled transformerless readout system.

A further method of isolating the energizing voltage of transducer 18'' from the oscilloscope by use of a blocking capacitor is shown in FIG. 4, wherein the transducer 18'' is wound with a single conductor 24, its ends terminating at connector 25 as clearly described in FIG. 1. Electrically connected to one end of the winding conductor 24 at connector 25'' is one conductor 20' of cable 20 which is connected to the negative terminal 48 of battery 28 and also grounded as at 49, as hereinbefore described.

Conductor 20'' of the cable 20 is electrically connected at connector 25 to the other end of the transducer conductor 24 and connects to the positive terminal 52 of the battery 28, thus the transducer 18'' is energized by battery 28 as explained earlier herein. Connected to positive terminal 52 of the battery 28 is a blocking capacitor 53 which is connected at its other end to the input terminal 36 of oscilloscope 37, and a lead 54 is arranged to be connected from the negative terminal 48 of battery 28 to the ground terminal 38 of the oscilloscope 37. It is believed to be clear from the foregoing that the battery voltage is effectively isolated from the oscilloscope and, further that the blocking capacitor 53 must have a low impedance at the signal frequency produced by the hammer blow, thus allowing the magnetostrictive signal to be passed into the oscilloscope.

It will also be clear that an oscillograph tape recorder or other recording means may be substituted for the oscilloscope if permanent recordation is desirable.

Although this description has been directed only toward a condition where a steel pipe pile or an H-beam is used, it is to be understood that this concept will function equally as well with any pile which either has a content of magnetic material or is a reinforced concrete pile which contains steel-reinforcing rods. Moreover, if desirable, by addition of a partial steel jacket suitably attached at its upper and lower ends to the pile near the drive cap and moving the transducer to the top of the pile, the utility of this invention may thus encompass even piles of nonmagnetic materials.

What is claimed is:

1. In a pile driving apparatus having a hammer for driving a pile formed at least in part of magnetostrictive material, the improvement comprising: sensing means positioned in close proximity to said pile, proximate said magnetostrictive material, supported independently of said pile and spaced therefrom for sensing magnetostrictive effect in said pile as a measure of the force of longitudinal blows applied to the top of said pile; and means coupled to said sensing means for receiving a signal therefrom and for indicating the force of said blows to said pile.

2. An arrangement as claimed in claim 1, wherein said sensing means for sensing the magnetostrictive effect as a measure of the force of the blows includes a coil means positioned about said pile for sensing the magnetostrictive effect in said pile produced by the blows delivered thereto.

3. An arrangement as claimed in claim 1, wherein said means for receiving a signal from said sensing means includes indicating means for indicating dynamic forces applied to the top of said pile, said indicating means being of a peak-indicating type.

4. An arrangement as claimed in claim 1, wherein said sensing means includes coil means positioned about said pile, and further comprising DC supply means, said coil means being connected to said DC supply means for establishing a magnetic field level in said pile.

5. In a pile driving apparatus having a hammer for driving a pile, formed at least in part of magnetostrictive material, the improvement comprising: sensing means including coil means positioned in close proximity to said pile, proximate said magnetostrictive material and spaced therefrom for sensing magnetostrictive effect in said pile as a measure of the force of blows to said pile, and means for receiving a signal from said coil means for indicating the force of said blows to said pile, and wherein said coil means is positionable about said pile on the ground into which it is to be driven.

6. In a pile driving apparatus having a hammer for driving a pile, formed at least in part of magnetostrictive material, the improvement comprising: sensing means including coil means positioned in close proximity to said pile, proximate said magnetostrictive material and spaced therefrom for sensing magnetostrictive effect in said pile as a measure of the force of blows to said pile, and means for receiving a signal therefrom and for indicating the force of said blows to said pile, and wherein said coil means includes a bifilar winding, and further comprising DC supply means, one winding of said bifilar winding being connected to said DC supply means for establishing a magnetic field level in said pile.

* * * * *